No. 780,154. PATENTED JAN. 17, 1905.
C. H. BRYAN.
RUBBER TIRE.
APPLICATION FILED JUNE 22, 1904.
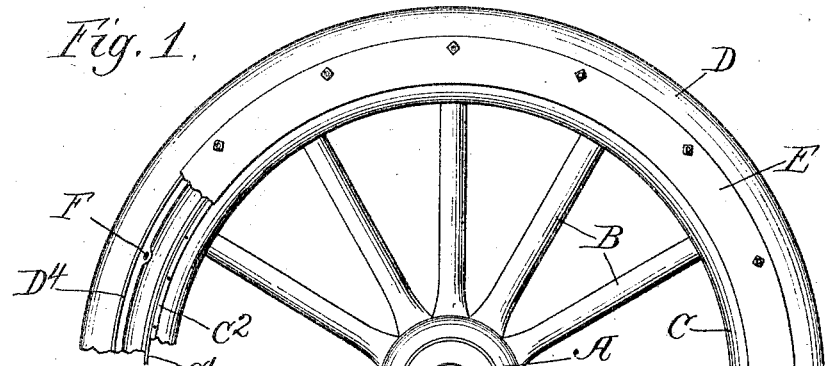
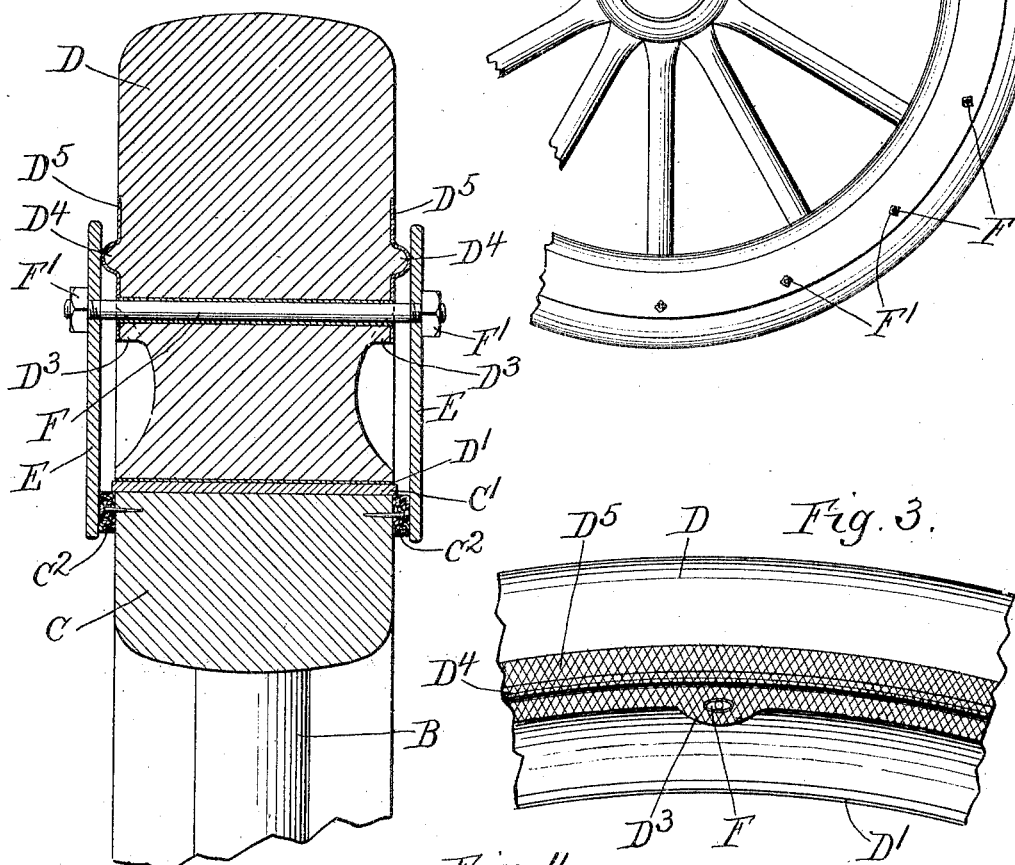
Witnesses,
Edward T. Wray,
Homer L. Krafft
Inventor.
Clarence H. Bryan,
by Parker Parker
Attorneys.

No. 780,154. Patented January 17, 1905.

UNITED STATES PATENT OFFICE.

CLARENCE H. BRYAN, OF CHICAGO, ILLINOIS.

RUBBER TIRE.

SPECIFICATION forming part of Letters Patent No. 780,154, dated January 17, 1905.

Application filed June 22, 1904. Serial No. 213,616.

*To all whom it may concern:*

Be it known that I, CLARENCE H. BRYAN, a citizen of the United States, residing at Chicago, in the county of Cook and State of Illinois, have invented a certain new and useful Improvement in Rubber Tires, of which the following is a specification.

My invention relates to elastic tires for vehicle-wheels and the like, and has for its object new and improved constructions for such devices.

One form of my device as applied to a wheel of ordinary construction is shown in the accompanying drawings, wherein—

Figure 1 is a side elevation of a wheel and tire. Fig. 2 is a cross-section through the tire and felly of the wheel on a radial line of the wheel. Fig. 3 is a side view of a portion of a tire with the holding device removed; Fig. 4, a plan view of one of the bolts, and Fig. 5 an end view of such bolt.

Like parts are indicated by like letters of reference in all the figures.

A represents the hub of the wheel; B B, the spokes; C, the felly of the wheel, which is preferably made of wood and has on its perimeter a metal band or hoop $C'$. I also provide the felly with two annular washers $C^2 C^2$. These may be made of leather or other tough material not easily abraded, one being fastened on each side of the felly. The tire D is made of some elastic material, as rubber, and is flat on its inner circumference, so as to rest firmly on the felly of the wheel. This inner contacting surface may be provided with a sheathing of fabric $D'$ to protect the rubber from wear. The tire is preferably of considerable thickness from the rim to its tread in proportion to its lateral dimension and is held in position upon the rim by the flange devices E E. To this end the tire at intervals is pierced by a series of holes which extend from one side of the tire to the other and are preferably located somewhat nearer the inner than the outer circumference of the tire. These holes are oval in cross-section, as shown, and may be lined with fabric for protection of the rubber. Through the holes loosely extend bolts F of like shape, having cylindrical screw-threaded portions at each end. The part of these bolts which is oval in its cross-section is made somewhat longer than the thickness of the tire. If the tire be made of like thickness with the wheel-felly, these bolts may be made as long as the thickness of such felly with the washers $C^2 C^2$ added. The bolts F, passing through the tire, serve to connect the same with the flange devices E E, the tire being, as it were, suspended on these bolts between the flanges. These flanges consist of annular pieces of metal with holes through which the ends of the bolts F F pass. The nuts $F' F'$ secure the bolts to the flanges. The tire between the place of its attachment to the flange devices and its seat upon the rim is reduced in cross-section. This may be done by having annular grooves in the sides of the tire at this place in the manner shown, the purpose, however, being to permit the expansion of the tire within the flange part. The particular shape at this place is not material. At each of the bolt-holes $D^2$ the tire is formed so as to have the projecting part $D^3$, which serves to give a firmer support for the bolts. Around the sides of the tire, a little beyond the bolt-holes, are the circular beads $D^4 D^4$, which extend outwardly to the flanges E E. These portions of the tire I preferably protect with the strips of fabric $D^5 D^5$. I have thus described with some particularity the form of tire which I prefer to use; but it will be clear that there might be considerable change made in the forms and dimensions generally without departing from the purpose of my invention. The tire may be made of one piece of rubber or more than one and of solid material or with an interior aperture or apertures, as desired. Likewise the precise position of the bolt-holes might be changed, also the relative proportion between radial and lateral thicknesses.

The annular washers $C^2 C^2$, as above stated, I make of leather, and I have found by actual experience that leather is well nigh indispensable for this purpose.

I have spoken of the bolt-holes as "oval in cross-section;" but they might be other shapes. The purpose is to present a relatively flat and broad bearing-surface between the tire and the bolt when the bolt is in the line of pressure. It is therefore evident that other forms of bolts might be used, although I prefer the oval.

The tire D is shown as flat on its inner surface. It might here have another than flat surface; but the structure involves the idea of a broad wearing-surface at this point rather than a narrow, and the tread of the wheel may be broad or narrow, as preferred. I have here shown it broad. The inner lateral development of the tire gives it a bearing against the flange devices E E, which, together with the support which the tire receives from the bolt and the bearing of the circular beads on the flanges, prevents the tire from doubling over, which it might tend to do on account of its great depths were it not for such supports. The bolts secure the flanges together, making a sort of annular cage-like device which may move bodily with reference to the wheel and either along diameters of the wheel in response to the yielding of the tire or about the wheel in response to the tendency of the tire to crawl or travel around the wheel. The circular beads not only serve as guides, but also to keep the dust from the interior of the devices, and the leather washers serve the same purposes. The bolt-holes through the tire, together with the various bearing and wearing surfaces of the tire other than the tread, are preferably lined with fabric. This prevents the bolt-holes from tearing.

I have in the foregoing described one form of my invention; but it will be obvious that there might be considerable modification of constructions without departing from the broad spirit of my invention, and therefore I do not wish to be understood as limiting myself to the particular forms, devices, and constructions herein shown and described.

The use and operation of my invention are as follows: When the parts are assembled on a vehicle-wheel, the tire will rest somewhat firmly upon the metal shoe or hoop surrounding the felly of the wheel. The flanges E E, secured against the shoulders formed by the oval part of the bolts F F, will hold the tire from bending laterally and from slipping from the rim. At the same time these flanges will move up and down with the compression of the tire, sliding along the washers $C^2 C^2$. The shape of the tire between its place of connection with the flanges and its seat on the rim permits the expansion of the tire within such flanges and also adds to the resiliency of the tire by the reduction of material. By giving the tire a movable support with respect to the wheel-rim it is clear that I may utilize the total elasticity of the tire and may also have a tire which is of considerable thickness from its inner to its outer circumference in proportion to its lateral thickness, this resulting in a very resilient tire. The beads $D^4 D^4$ serve to keep dust out of the pocket formed between the tire and the flanges. The flattened shape of the bolts F F tends to reduce to a minimum the loss of elasticity caused by the presence of these non-elastic elements within the tire. As the tire at the place where it is pierced for the bolts is not as wide as the space between the flanges E E, when it is compressed there will be plenty of room for the spread of the rubber along these bolts without binding the tire between the flanges.

I claim—

1. The combination of a vehicle-wheel with an elastic tire substantially flat on its inner perimeter and having annular grooves on its sides in proximity thereto, and a movable guiding device connecting the tire with the rim and associated with the tire beyond such grooves.

2. The combination of a vehicle-wheel with an elastic tire, annular flanges vertically movable upon the rim of the wheel and bolts rigidly connecting such flanges and extending through and movably supporting such tire on the rim.

3. The combination of a vehicle-wheel with an elastic tire, annular flanges vertically movable along the rim of the wheel and laterally-elongated bolts piercing the tire approximately half-way between its inner circumference and its tread and rigidly secured to the annular flanges.

4. The combination of a vehicle-wheel with an elastic tire, flanges associated with the rim of the wheel and bolts passing through the tire and rigidly connected to the flanges at some distance beyond the tire on each side thereof so as to permit the spread of the tire along such bolts.

5. The combination of a vehicle-wheel with an elastic tire, annular flanges movably associated with the rim of the wheel, bolts rigidly connecting such flanges and adapted to extend through and movably support the tire on the rim and washers of leather or like material interposed between the sides of the rim and the flanges.

6. The combination of a vehicle-wheel with an elastic tire, annular flanges extending along the sides of the rim and the tire and movable with respect to the rim, bolts passing through the tire and secured to the flanges and an annular bead extending from the side of the tire into proximity with the flanges.

7. The combination of a vehicle-wheel having a substantially flat rim with an elastic tire of considerable radial thickness in proportion to its lateral thickness and having its inner perimeter flattened, a guiding device associated with the tire approximately midway between its inner and outer circumferences and movable vertically along the sides of the wheel-rim, washers of leather or like material interposed between such guiding device and the felly of the wheel and annular beads on the sides of the tire extending outwardly into proximity with the guiding device, such beads and the adjacent portions of the tire being covered with a tough fabric to prevent wear.

8. The combination of a vehicle-wheel with an elastic tire thereabout, connecting devices between the wheel and the tire movable radially with respect to one of such members, and bolts through the tire connecting the tire with such connecting devices, said bolts presenting relatively broad and flat surfaces substantially at right angles to the diameter of the wheel.

9. The combination of a vehicle-wheel with an elastic tire thereabout, connecting devices between the wheel and the tire, and bolts through the tire connecting the tire with such connecting devices, the tire reduced in cross-sectional area between the bolts and the wheel, but provided with a relatively broad bearing on the wheel.

10. The combination of a vehicle-wheel with an elastic tire thereabout, connecting devices between the wheel and the tire, and bolts movable with respect to the wheel passing through the tire connecting the tire with such connecting devices, such tire provided with fabric-covered bearing-surfaces against which the bolts bear.

11. The combination of a vehicle-wheel with an elastic tire thereabout, connecting devices extending along the sides of the wheel and the tire adapted to permit the tire to creep about the rim, and bolts through the tire connecting the tire with such connecting devices, such tire provided with fabric-finished surface where it bears upon the wheel and the connecting devices.

12. The combination of a vehicle-wheel with an elastic tire thereabout, connecting devices between the wheel and the tire, bolts through the tire connecting the tire with such connecting devices, the body of the tire of less thickness than the space between such connecting devices, and annular projections on the tire which extend from the normal sides thereof to the connecting devices.

13. The combination of a vehicle-wheel with an elastic tire having annular grooves on its sides in proximity to its seating portion, and a movable device connecting the tire with the rim in such manner as to permit free resilient action of the tire along substantially its whole radial dimension and associated with the tire outside of such grooves.

14. The combination of a vehicle-wheel with an elastic tire, cross-pieces passing through and supporting the tire and capable of movement when the tire is compressed, means for confining the movement of such cross supporting-pieces to a direction substantially on a radial line of the wheel.

15. The combination of a vehicle-wheel with an elastic tire having its inner part beyond its seating part on the rim of diminished volume and movable supports for such tire at places between the seating part and the tread, such supports associated with the wheel so as to hold the tire in operative position thereon.

CLARENCE H. BRYAN.

Witnesses:
HOMER L. KRAFT,
PERCIVAL W. TRUMAN.